(12) United States Patent
Shah

(10) Patent No.: US 12,079,084 B2
(45) Date of Patent: Sep. 3, 2024

(54) DISTRIBUTED RAID FOR PARITY-BASED FLASH STORAGE DEVICES

(71) Applicant: Microsoft Technology Licensing, LLC, Redmond, WA (US)

(72) Inventor: Monish Shantilal Shah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 17/878,453

(22) Filed: Aug. 1, 2022

(65) Prior Publication Data

US 2024/0036976 A1    Feb. 1, 2024

(51) Int. Cl.
| | |
|---|---|
| *G06F 11/00* | (2006.01) |
| *G06F 3/06* | (2006.01) |
| *G06F 11/10* | (2006.01) |
| *G06F 12/02* | (2006.01) |

(52) U.S. Cl.
CPC .......... *G06F 11/108* (2013.01); *G06F 3/0616* (2013.01); *G06F 3/0658* (2013.01); *G06F 3/0685* (2013.01); *G06F 11/1096* (2013.01); *G06F 12/0292* (2013.01); *G06F 2212/1032* (2013.01)

(58) Field of Classification Search
CPC ............................ G06F 11/108; G06F 11/1096
See application file for complete search history.

(56) References Cited

U.S. PATENT DOCUMENTS

| | | | | |
|---|---|---|---|---|
| 2008/0256183 | A1* | 10/2008 | Flynn ................... | G06F 3/0688 |
| | | | | 711/E12.04 |
| 2012/0246443 | A1* | 9/2012 | Meir ................... | G06F 11/1096 |
| | | | | 711/E12.078 |
| 2015/0193158 | A1* | 7/2015 | Yoon ...................... | G06F 11/108 |
| | | | | 711/105 |
| 2015/0212752 | A1* | 7/2015 | Nemazie ............... | G06F 3/0616 |
| | | | | 711/103 |
| 2016/0196216 | A1* | 7/2016 | Lee ........................ | G06F 3/0631 |
| | | | | 711/170 |
| 2016/0283303 | A1 | 9/2016 | Sharma et al. | |
| 2018/0341606 | A1* | 11/2018 | Bolkhovitin .......... | G06F 3/0656 |
| 2020/0042390 | A1 | 2/2020 | Roberts | |

(Continued)

OTHER PUBLICATIONS

"Raise", Retrieved from: https://web.archive.org/web/20220409002849/https://www.ampinc.com/wp-content/uploads/2013/09/RAISE.pdf, Apr. 9, 2022, 2 Pages.

(Continued)

*Primary Examiner* — Philip Guyton
(74) *Attorney, Agent, or Firm* — Ray, Quinney & Nebeker; Christopher K. Hallstrom

(57) ABSTRACT

The present disclosure relates to utilizing a storage system that improves memory storage and access by utilizing a distributed erasure coding RAID. For example, the storage system stores a mapping table within volatile memory of one or more SSDs on a set of RAID SSDs. In particular, a mapping table stored in one SSD in the SSD set includes mapping information corresponding to data stored in another SSD in the SSD set. In this manner, the storage system can significantly reduce the number of operations needed to write new data to the set of SSDs from previous methods that required multiple reads and multiple writes.

20 Claims, 10 Drawing Sheets

(56) References Cited

U.S. PATENT DOCUMENTS

2020/0133777 A1* 4/2020 Lesartre ................ G06F 3/0688
2022/0229722 A1* 7/2022 Karkra .................. G06F 3/0634

OTHER PUBLICATIONS

"Standard Raid levels", Retrieved from: https://en.wikipedia.org/wiki/Standard_RAID_levels, Jun. 28, 2022, 10 Pages.
Shadley, Scott, "NAND Flash Media Management Through Rain", Retrieved From: htttps://web.archive.org/web/20210812183125/https://www.micron.com/-/media/client/global/documents/products/technical-marketing-brief/brief_ssd_rain.pdf, Aug. 12, 2021, 7 Pages.
"International Search Report and Written Openion issued in PCT Application No. PCT/US23/027446", Mailed Date : Sep. 27, 2023, 9 Pages.

* cited by examiner

ID
DISTRIBUTED RAID FOR PARITY-BASED FLASH STORAGE DEVICES

BACKGROUND

Recent years have seen significant advancements in both hardware and software with respect to digital storage and memory devices. For instance, solid-state drives (SSDs), which typically implement a controller and solid-state storage in the form of NAND flash memory or chips, are continually improving in terms of capacity and performance. For example, many SSDs now include dynamic random access memory (DRAM) to improve data access and storage with respect to NAND flash memory.

Additionally, various existing computer systems utilize an array of SSDs to provide increased data protection. For example, RAID (redundant array of independent disks) and similar schemes provide data protection through redundancy. In particular, some RAID schemes, such as RAID4, RAID5, and RAID6, utilize a parity-based scheme to recover lost data in the event of a drive failure. Despite these and other advancements, problems still remain with respect to data storage on NAND flash storage devices (e.g., SSDs) that utilize parity-based data protection schemes.

To illustrate, existing computer systems that utilize parity-based RAID across multiple SSDs (and similar schemes) are inefficient. In particular, while SSDs that have NAND flash memory enable writing data to memory in both large and small amounts, the workload of these SSDs can necessitate a significantly higher amount of small writes (e.g., memory block writes that are less than a full RAID stripe of an SSD). Indeed, these SSDs perform a high volume of random small memory block writes to maintain existing data as well as store new data. However, SSDs currently require additional operations and steps to write new data to an SSD disk in a set of SSDs.

To illustrate, each time data is to be written to an SSD having a parity-based RAID scheme, many existing computer systems must perform at least two read operations and two write operations. For example, in the case of a small block write that does not cover an entire data sector, an existing computer system writes the new data to an available sector, reads the old data, and also reads the data of the corresponding parity. The computer system then uses the old data and the corresponding parity to remove the old data from the parity (e.g., via an XOR operation). Further, the computer system determines a new parity based on the new data (e.g., via another XOR operation) and writes a new parity back for the new data. As noted above, one write often results in two read operations and two write operations, which inefficiently utilizes resources, causes extra overhead operations to occur (e.g., additional garbage collection, wears out drive components faster due to additional drive usage, and creates longer delays in writing data). Moreover, these problems are compounded when multiple small random writes are to be performed.

To address the above issue, some existing computer systems utilize an additional hardware controller (e.g., a RAID controller or memory controller) that serves as an intermediary between a host device and the SSDs. In these cases, the hardware controller requires additional DRAM to maintain a mapping table of where data and parity are stored across the set of SSDs. However, the additional DRAM on the hardware controller requires additional components (and costs) not commonly included in most computing devices. For example, some components add an additional SSD just to store data from the DRAM. Additionally, if the hardware controller fails or is corrupted (e.g., the memory table is lost due to a power failure), access to the SSDs may be temporarily or permanently blocked. As a result, a large amount of time and/or several steps are needed to restore the hardware controller, which can further result in significant performance loss. Further, these existing computer systems unnecessarily require added components and costs to operate.

These and other problems result in significant inefficiencies of existing computing systems with respect to data storage and protection utilizing parity-based RAID SSD schemes and similar schemes.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
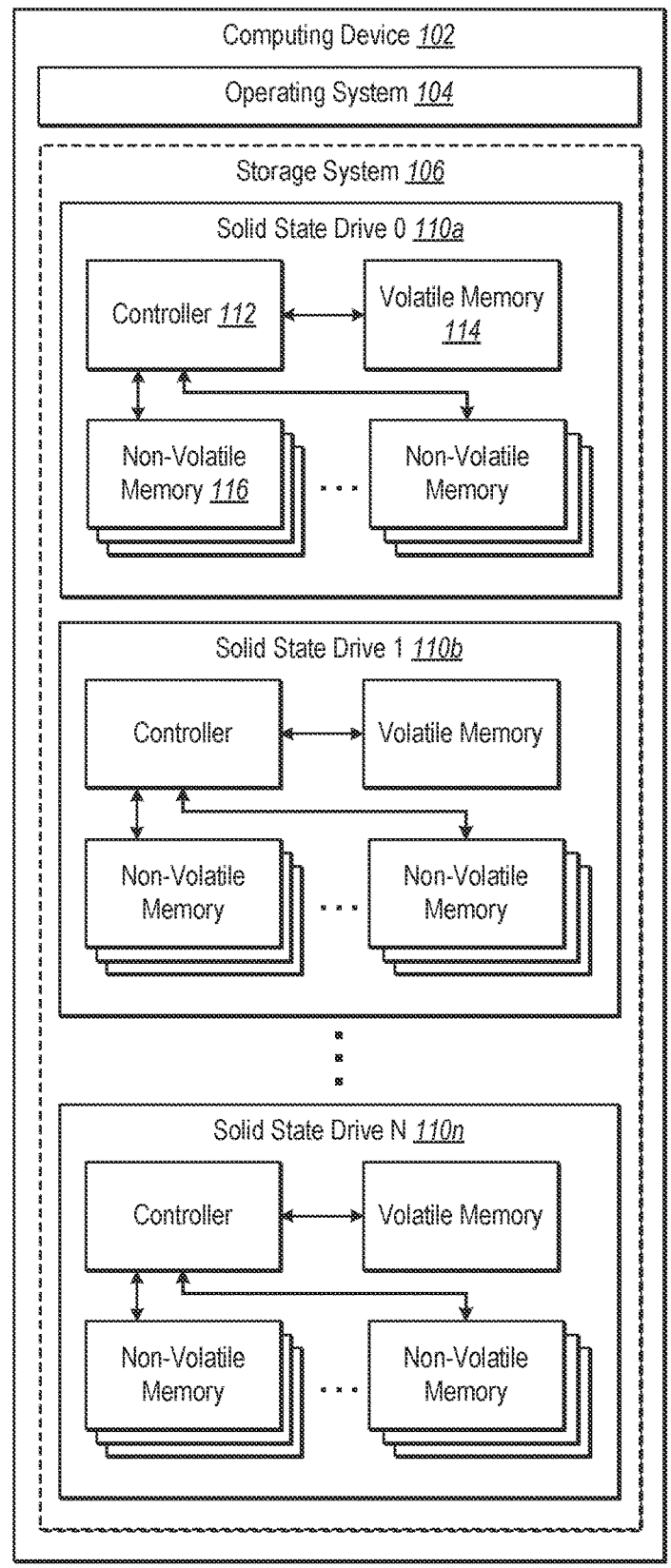
FIGS. 1A-1B illustrate a diagram of a computing device where a storage system is implemented in accordance with one or more implementations.

Implementations of the present disclosure provide benefits and/or solve one or more of the foregoing or other problems in the art with systems, methods, and computing devices that provide a storage system that improves memory storage and access by utilizing a distributed parity-based RAID. For example, the storage system stores a mapping table within volatile memory of one or more SSDs on a set of RAID SSDs. In particular, a mapping table stored in one SSD in the SSD set includes mapping information corresponding to data stored in one or more SSD in the SSD set. In this manner, the storage system can significantly reduce the number of operations needed to write new data to the set of SSDs from multiple reads and multiple writes to one or two writes.

To illustrate, in many implementations, the storage system (i.e., a parity-based RAID storage system) maintains data in non-volatile memory (e.g., NAND flash memory) across a set of SSDs (solid-state drives), where the set of parity-based error coding SSDs (e.g., RAID4 or RAID 5) includes a primary SSD and one or more secondary SSDs. In some implementations, the storage system stores some or all of a mapping table within volatile memory (e.g., DRAM) of the primary SSD that indicates where a sector of the data is located at a first non-volatile memory location (e.g., memory block) within one of the secondary SSDs. Additionally, the storage system can write a new piece of data at a second non-volatile memory location within a secondary SSD as well as write a new parity for the new piece of data at another non-volatile memory location within the set of SSDs. Further, the storage system can update the mapping table within the volatile memory on the primary SSD to indicate the new non-volatile memory location of the new piece of data on the secondary SSD.

In additional implementations, the storage system maintains one or more additional portions of the mapping table on one or more secondary SSDs in the SSD set. For example, the storage system stores a different portion of the mapping table within the DRAM of each SSDs (excluding the parity disk) in the SSD set. In many implementations, a mapping table portion stored on one SSD includes mappings for one or more other SSDs in the SSD set.

In some implementations, the storage system can facilitate a storage controller (e.g., RAID controller) to operate on one or more of the SSDs. For instance, the storage system implements the storage controller on the primary SSD. In one or more implementations, the storage system divides up the storage controller across multiple SSDs in the SSD set (e.g., multiple SSDs each perform some storage controller functions). In various implementations, the storage controller (e.g., RAID controller) is located external to the storage system. In these implementations, however, the storage system can still keep the mapping table within the volatile memory (e.g., DRAM) of one or more SSDs to reduce the number of operations needed to write new pieces of data (e.g., small memory block writes).

As described herein, the storage system provides several technical benefits in terms of computing flexibility and efficiency compared to existing computing systems. Indeed, the storage system provides several practical applications that deliver benefits and/or solve problems associated with SSD memory devices and systems.

As an overview, because of the architecture of NAND flash memory chips, it is often not possible to overwrite old data with new data at the same location (e.g., memory block). Instead, new data is written to a new location and the old data is marked as invalid. Also, to maintain data, NAND flash memory chips can require refreshing data, which can involve moving valid data out of sectors that include invalid data. Accordingly, when utilizing NAND flash memory chips, a garbage collection process can be performed to discard old invalid data and recover available memory block space.

Additionally, to keep track of where data is stored across a set of SSDs, a mapping table can be used to map logical addresses of data pieces to physical addresses within the NAND flash memory chips. Conventionally, a mapping table is stored within DRAM associated with a flash translation layer (FTL) of a controller. In some instances, the controller is a hardware device. In other implementations, the controller is software implemented by a host operating system (OS) or another component. However, as noted above, conventional systems are inefficient and prone to data loss. In contrast, implementations of the storage system disclosed herein are efficient.

To illustrate, in various implementations, the storage system improves efficiency by maintaining mapping tables within one or more of the SSD of a parity-based RAID storage system. For example, the storage manager maintains a mapping table within the DRAM (i.e., volatile memory) on a primary SSD that indicates where data is stored on one or more secondary drives and, in some instances, on the primary drive. In this manner, the storage system first generates the mapping, then it performs the SSD operations, which results in the storage system reducing the number of operations needed to write new data to an SSD in a set of SSDs. Indeed, in many implementations, the number of operations is reduced from four or more operations (e.g., at least two reads and two writes) to two or fewer operations (e.g., a single write or two writes). Further, by storing the mapping table in DRAM, the storage system increases the retrieval rate of accessing the mapping table and looking up locations for stored data on the NAND flash memory.

Additionally, the storage system can improve efficiency by holding new data in volatile memory until multiple pieces of new data are ready to be written. In these implementations, the storage system can write multiple random small writes to a location in the SSD set with a single parity for all of the new data. As a result, the storage system can further improve efficiencies by not having to do a parity correction write each time a new piece of data is added.

In addition, the storage system improves efficiency and accuracy by maintaining portions of the mapping table on different SSDs within the SSD set, which also provides the benefit of providing a symmetric implementation across all SSDs in the SSD set. For example, if an SSD set includes N drives plus a parity drive (e.g., N+1 drives), the storage system can divide and store 1/N of the mapping table on N drives, such as within the DRAM of each of the N SSDs. For instance, a first SSD includes a first portion of the mapping table that includes data locations for data on the N+1 drives and a second SSD includes a second portion of the mapping table that includes additional data locations for additional data on the N+1 drives. In these implementations, in the event of an SSD failure, only a fraction of the mapping table is lost. Further, in some implementations, the storage system may be able to expeditiously recover and restore the missing mapping table information along with restoring data from the lost SSD.

Further, the storage system improves efficiency and accuracy by utilizing a storage controller within one or more of the SSDs in the SSD set. For example, in various implementations, the storage manager operates without a traditional storage controller. In this manner, the storage system avoids the computing costs, capital costs, and operational costs of such a controller. However, if a central storage controller is available, the storage system can utilize the storage controller in connection with maintaining mapping tables within the DRAM of the SSDs in an SSD set.

As illustrated in the foregoing discussion, the present disclosure utilizes a variety of terms to describe the features and advantages of one or more implementations described herein. For instance, the term "solid-state drive" (SSD) refers to a type of flash storage device that includes flash chips, Dynamic Random Access Memory (DRAM), and a controller. In various implementations, the flash chips are NAND flash memory. In some implementations, the controller is configured to receive and provide data over an input/output (I/O) bus. In various implementations, SSDs are used to host virtual machines and other computing components.

As used herein, the term "erasure coding" (sometimes called error coding and/or "EC") refers to a method of data protection where data is broken into fragments, encoded with redundant data pieces, and stored across a set of different locations or storage media with the ability to recover the data in the face of some partial erasures of data. Erasure coding can include forms of parity including simple parity. RAID4, RAID5, and RAID6. Additionally, erasure coding can also include more sophisticated erasure codes such as Reed-Solomon.

As used herein "RAID" or "redundant array of independent disks" refers to multiple physical drives (e.g., SSDs) being combined into a single storage unit. In various implementations, a RAID setup provides redundancy to protect against drive failure. In some implementations, one or more storage controllers implement a RAID scheme. Additionally, RAID schemes described herein refer to erasure coding RAID schemes (including parity-based RAID schemes) that utilize parity to protect against partial or full drive failure. Indeed, parity can be used to restore lost data in the event of a drive failure. For example, the storage system disclosed herein works with RAID4, RAID5, RAID6, and possibly additional future RAID schemes that are parity-based.

Notably, when the description herein refers to RAID schemes and parity-based RAID schemes in particular, the techniques, methods, and approaches of the storage system can also be applied to more advanced erasure coding schemes. For example, the implementations described herein work with other erasure code schemes, such as Reed-Solomon, that utilize redundant information to mitigate drive failure for a set of drives (e.g., SSDs) that are logically connected to each other to form a unified storage unit.

Additionally, the term "storage mapping table" (or simply mapping table) refers to a data structure that indicates a correlation between a logical block address and a physical location for stored data. For example, a mapping table indicates on which SSD drive, along with the physical address (e.g., memory blocks) on the drive, where target data is stored. Often, with NAND chips, the mapping table is constantly being updated to accurately reflect data being moved about between one or more SSDs. In various implementations, the mapping table is stored in volatile memory, such as DRAM. In some implementations, the mapping table or a copy of the mapping table is stored in non-volatile memory (NVM), such as NAND flash memory.

Figure 1B:
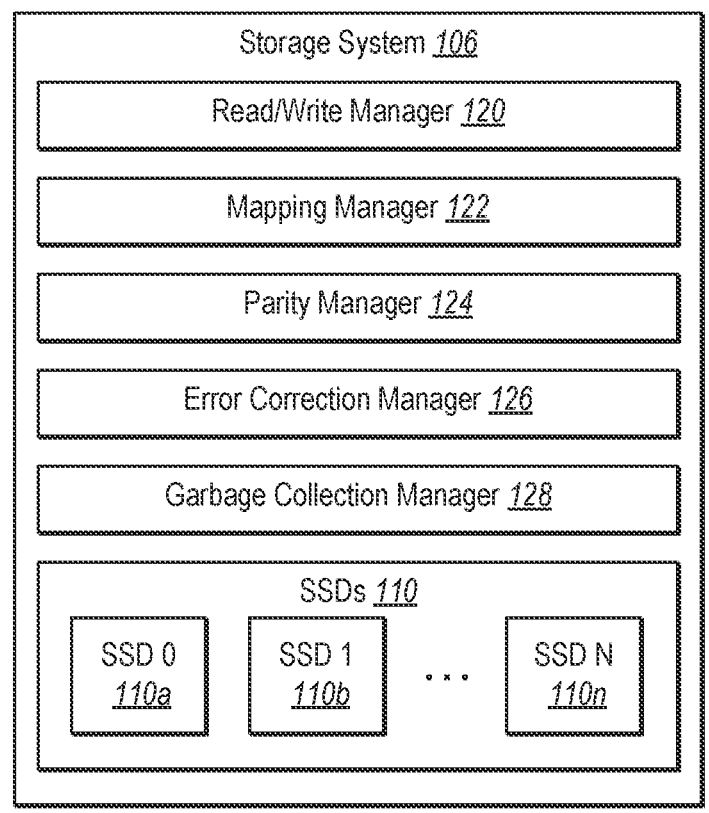

As used herein, a "cloud-computing system" refers to a network of connected computing devices that provide various services to computing devices (e.g., client devices, server devices, provider devices, customer devices, etc.). For instance, as mentioned above, a distributed computing system can include a collection of physical server devices (e.g., server nodes) organized in a hierarchical structure including clusters, computing zones, virtual local area networks (VLANs), racks, fault domains, etc. In various implementations, the network is a virtual network or a network having a combination of virtual and real components. Often, cloud computing systems utilize computing devices that include parity-based SSD schemes to facilitate cloud storage, virtual machines, and/or other services Additional detail is now provided regarding the components and elements of the storage system. For example, FIGS. 1A-1B illustrate a computing device where a storage system is implemented in accordance with one or more implementations. In particular, FIG. 1A includes the computing device 102 and FIG. 1B provides additional detail regarding components and elements of a storage system 106.

Figure 8:
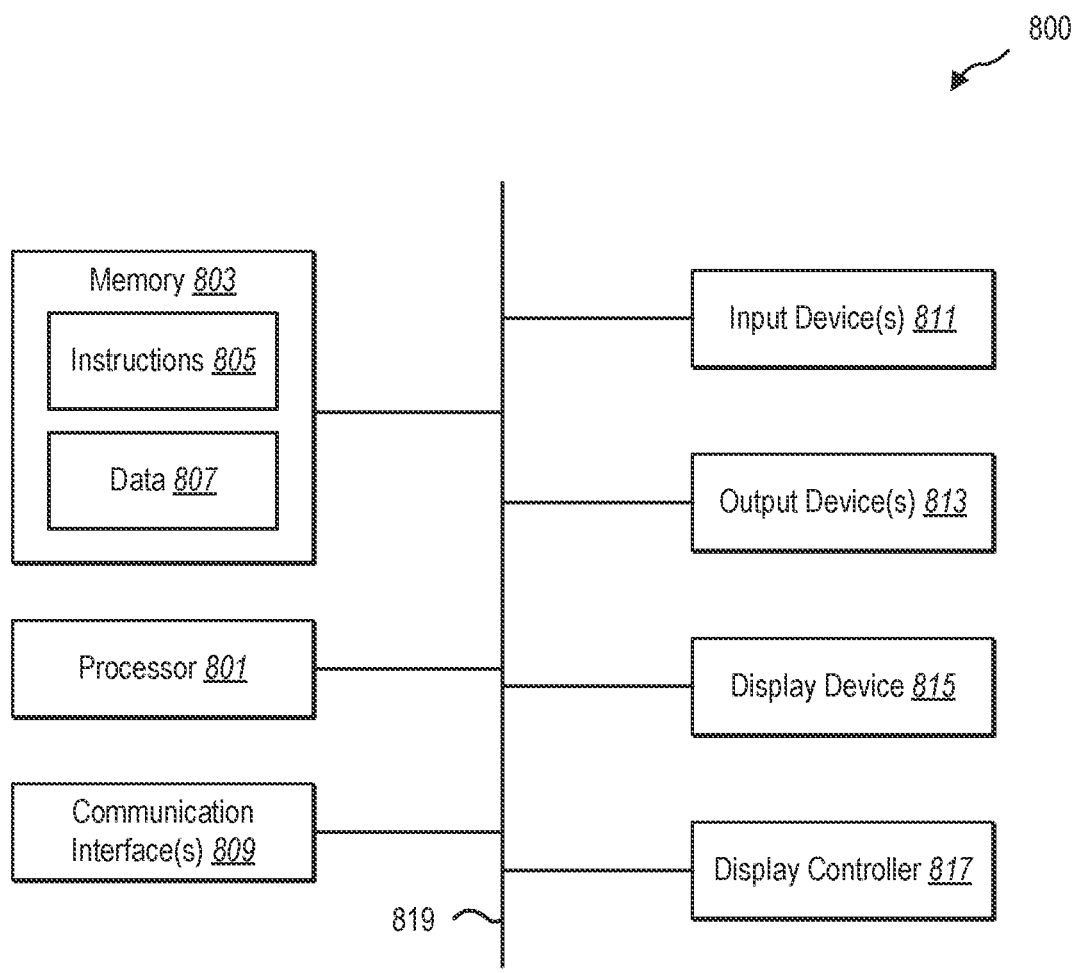
FIG. 8 illustrates certain components that may be included within a computer system.

As shown in FIG. 1A, the computing device 102 includes an operating system 104 and the storage system 106. In various implementations, the operating system 104 is associated with a processor, applications, and other computing components. While the storage system 106 is shown as being separate from the operating system 104, the computing device 102 can be implemented from various locations within the computing device 102 (e.g., on a separate hardware component), including partly or wholly in the by the operating system 104. In various implementations, the storage system 106 is implemented on a different device or multiple devices. Additionally, in many implementations, the computing device 102 implements a parity-based RAID scheme that utilizes parity-based error coding to mitigate an SSD drive failure. FIG. 8 below provides additional detail regarding computing devices, such as the computing device 102.

In various implementations, the computing device 102 is part of a cloud computing system. For example, the computing device 102 is utilized for cloud storage, virtual machine operations, or a variety of services that are provided by a cloud computing system that relies on a parity-based RAID scheme. In alternative implementations, the computing device 102 operates as a separate computing system and/or belongs to a non-cloud computing system.

As illustrated in FIG. 1A, the computing device 102 includes the storage system 106 having N solid-state drives (SSDs), where N represents a non-zero integer. As shown, the N SSDs include solid-state drive 0 110$a$, solid-state drive 1 110$b$, and solid-state drive N 110$n$ (collectively called the SSDs 110). Each of the SSDs 110 includes a controller 112, volatile memory 114, and non-volatile memory 116.

In various implementations, an SSD represents a NAND flash storage device. For instance, the non-volatile memory 116 includes physical NAND flash memory chips ("NAND chips"). For example, multiple NAND chips connect to the controller 112. To illustrate, the non-volatile memory 116 includes 8 NAND chips that each connect to the controller 112. Further, each of the 8 NAND chips connects to a bus of 4 additional NAND chips to make a set of 32 NAND chips.

According to some implementations, the non-volatile memory 116 can handle storage access commands received over an input/output (I/O) bus. In some implementations, the controller 112 may be implemented as an application-specific integrated circuit (ASIC), a field-programmable gate array (FPGA), a microcontroller, and/or a microprocessor. In addition, the controller 112 can be integrated within an SSD or be located outside of the SSD. Further, in various implementations, the controller 112 can facilitate read and write operations of the NAND chips of an SSD such that the operating system 104 need not perform buffering operations with the SSD.

In several implementations, the controller 112 can include a flash translation layer (FTL). In one or more implementations, the FTL is a layer of hardware and/or software that performs various operations on an SSD. For example, the FTL enables the storage system 106 to perform logical-physical address translations, garbage collection (GC), bad block management (BBM), page allocation, and error correction coding (ECC). In various implementations, the controller 112 connects to the volatile memory 114 via a connection enabled by the FTL.

In one or more implementations, the volatile memory 114 includes DRAM (or another type of RAM) that serves as a cache or buffer to store data while it is waiting to be written to the non-volatile memory 116. In additional implementations, the volatile memory 114 stores a mapping table (or portion of a mapping table) for data stored on the non-volatile memory 116. In various implementations, the volatile memory 114 lacks the capacity to store a full version of a mapping table.

In many implementations, the SSDs 110 are identical drives. In alternative implementations, the SSDs 110 are non-identical. For example, one of the SSDs 110 has a different storage size, chip manufacture type, block or sector size, firmware version, and/or production version.

In some implementations, the SSDs 110 are implemented in a RAID scheme or system (e.g., RAID5). For example, in some instances, a RAID scheme includes N+1 SSD storage devices that provide N devices of capacity. In various implementations, the additional capacity of the "+1" drive can be used to store bitwise parity (or simply parity) and parity can be used to re-create data from a drive that has stopped working or otherwise failed. Additionally, in various implementations, the SSDs 110 utilize another type of erasure coding that can recover lost data from more than one failed SSDs. For instance, given N+M SSDs, up to M SSD failures can be recovered.

In example implementations, an SSD has a 4 KB native sector size. In some instances, 512B addressing is still supported but operations that are not aligned to 4 KB boundaries, but can result in needing to perform a read-modify-write operation. In various implementations, the storage system 106 performs interleaving (e.g., at multiples of 4 KB) when implementing RAID on the SSDs 110. Additionally, a single RAID stripe can have N×4 KB sectors of data where each sector is stored in a different SSD in an SSD set plus a 4 KB sector that is the bitwise parity of these N sectors.

Additionally, when writing data to the SSDs 110, if a single write is large enough to cover an entire RAID stripe, then a RAID controller (i.e., the storage system 106) can compute the parity across the new data for the N sectors and write all N+1 sectors at once. However, if the storage system 106 is writing to a single sector of the non-volatile memory 116 without having all the data needed to compute the new parity, then problems and inefficiencies may be encountered if conventional methods are followed, as provided above. Indeed, as noted previously, existing computer systems have to write new data to a block, read the old data from another block, read the old parity from yet another block, perform a calculation to remove the old data from the parity, and write a new parity to a new block. As a result, this process of a single write turns into two reads and two writes and various calculation steps, which causes a performance hit.

In contrast to existing computer systems, the storage system 106 can reduce the writing process to as little as a single write (when the parity write is combined with other new writes). More specifically, the storage system 106 writes 1+1/N writes on average for each sector write (i.e., every N writes turns N+1 writes when parity writes are added). In various implementations, the storage system 106 accomplishes this by maintaining mapping tables in the volatile memory 114 on one or more of the SSDs 110. Further, in many implementations, the mapping table stored on one SSD includes mappings for the other SSDs in the SSDs 110. Indeed, having an SSD store its own mapping table in its own DRAM would provide no protection or redundancy in the event of a drive failure as the drive mapping would be fully lost.

Additionally, unlike hard disk drives (HDDs), SSDs need constant remapping. For example, the first time a piece of data is stored, it is written to a first specific place in the NAND. Then, the next time the piece of data is written, it is written to some other place. The third time the piece of data is written, it will land in yet another place. Rarely will a piece of data land in the same place as a previous version of the data. Indeed, with NAND, the SSDs utilize a multistep erasing and garbage collection process before a block can be rewritten. Often, the garbage collection process includes erasing multiple adjacent blocks together and moving any valid data to a new location without the blocks marked for deletion (e.g., TRIM blocks).

In various implementations, the SSDs 110 utilize NVMe and/or PCIe as interfaces to communicate with the operating system 104 and/or other SSDs. In one or more implementations, the storage system 106 utilizes PCIe to communicate with a server or desktop processor or a peripheral device (e.g., an SSD, NIC, GPU) via the I/O bus. In some implementations, the storage system 106 utilizes NVMe sitting on top of PCIe to communicate between the SSDs 110. In various implementations, the storage system 106 utilizes an NVMe-like interface to communicate between the SSDs 110. As used herein, NVMe (non-volatile memory express) refers to a non-volatile memory host controller interface that is an open, logical-device interface for accessing non-volatile storage media of a computing device (e.g., usually attached via a PCI Express (PCIe) bus).

FIG. 1B provides additional detail regarding components and elements of a storage system 106, as noted above. In particular, FIG. 1B provides additional detail regarding the capabilities and components of the storage system 106. As shown, the storage system 106 includes various components and elements. For example, the storage system 106 includes a read/write manager 120, a mapping manager 122, a parity manager 124, an error correction manager 126, and a garbage collection manager 128. Additionally, the storage system 106 includes the SSDs 110 introduced above.

In various implementations, the controller 112 facilitates one or more of the actions performed by the storage system 106. For example, the controller 112 enables the read/write manager 120, the mapping manager 122, the parity manager 124, the error correction manager 126, and the garbage collection manager 128 to operate.

As shown, the storage system 106 includes the read/write manager 120. In one or more implementations, the read/write manager 120 receives, accesses, provides, edits, creates, or otherwise manages data and pieces of data written and read from the SSDs. For example, the read/write manager 120 writes data to blocks of the non-volatile memory 116 as well as retrieves data from the same.

As shown, the storage system 106 includes the mapping manager 122. In various implementations, the mapping manager 122 facilitates identifying, determining, accessing, or otherwise managing mapping data between logical and physical storage locations of the SSDs (the non-volatile memory 116). In various implementations, the mapping manager 122 generates a mapping table to store mappings. As noted above, the mapping manager 122 can store a mapping table in the volatile memory 114 of one or more of the SSDs 110. In many implementations, a mapping table on one SSD (or a portion of a complete mapping table) includes mapping information for data stored on other SSDs.

As also shown, the storage system 106 includes the parity manager 124. In various implementations, the parity manager 124 generates, identifies, calculates, edits, modifies, accesses, provides, or otherwise manages parities (e.g., bitwise parities). For example, the parity manager 124 determines a parity for one or more blocks that are being written. In some implementations, the parity manager 124 employs a reverse process to recover lost data on a failed drive.

As shown, the storage system 106 includes the error correction manager 126. In various implementations, the error correction manager 126 generates, identifies, calculates, edits, modifies, or otherwise manages error correction. For example, the error correction manager 126 utilizes various methods and algorithms to safeguard the accuracy and integrity of data being stored on the SSDs 110.

As also shown, the storage system 106 includes the garbage collection manager 128. In various implementations, the garbage collection manager 128 detects, removes, or otherwise manages garbage collection on the SSDs 110. For example, the garbage collection manager 128 performs garbage collection to free up available space and blocks within the SSDs 110.

Figure 2:
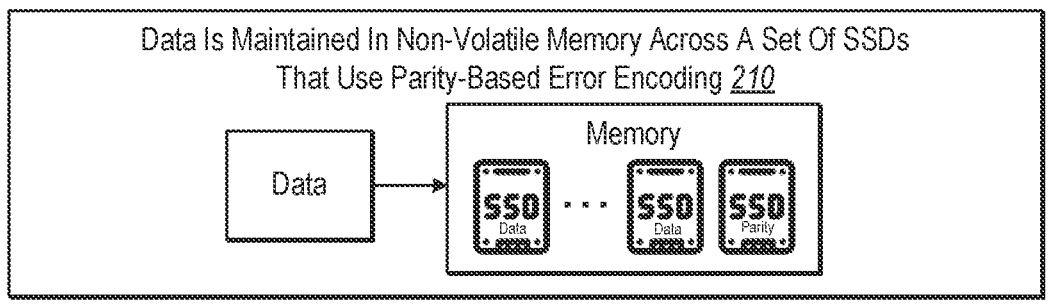
FIG. 2 illustrates an example workflow for efficiently managing and writing new data utilizing a parity-based RAID SSD scheme in accordance with one or more implementations.
Figure 2:
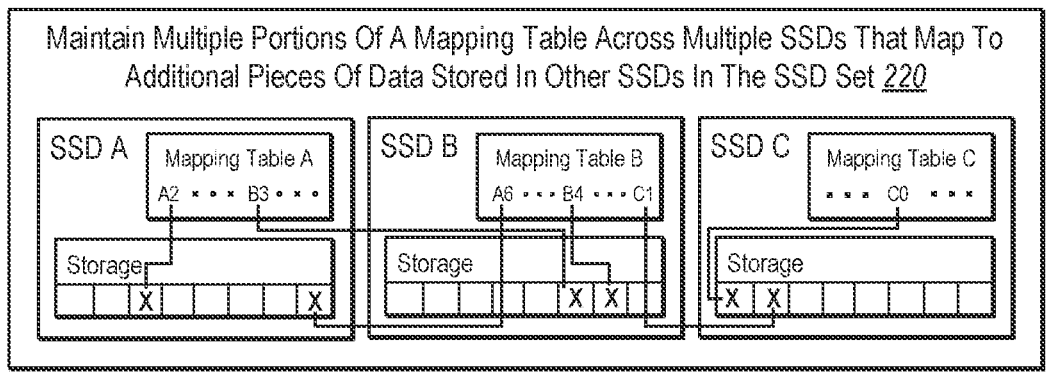
Figure 2:
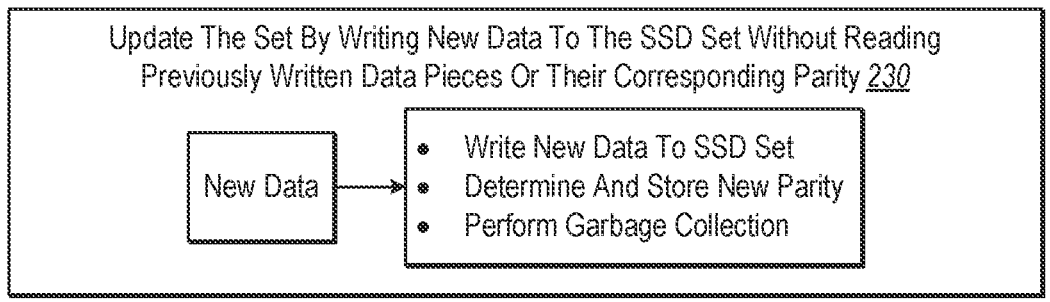

Additional detail in connection with an example implementation of the storage system 106 is discussed in connection with the next figure. To illustrate, FIG. 2 provides an example workflow for efficiently managing and writing new data utilizing SSDs having a parity-based RAID scheme in accordance with one or more implementations. As shown, FIG. 2 illustrates an overview 200 of the storage system 106.

As shown in FIG. 2, the overview 200 includes a first element 210 that displays data being maintained in non-volatile memory across a set of SSDs that use parity-based error encoding. For example, in various implementations, the storage system 106 generates a mapping table that links the logical addresses of data to their corresponding physical locations (e.g., memory blocks) stored across a RAID or RAID-like storage scheme (e.g., SSD set), which utilizes parity to protect against the loss of a drive. In addition, the storage system 106 stores the mapping table on one or more of the SSDs in the SSD set.

As shown, the overview 200 includes a second element 220 of maintaining multiple portions of a mapping table across multiple SSDs that map to additional data pieces stored in other SSDs in the SSD set. For instance, according to some implementations, the storage system 106 divides the mapping table into multiple portions. In addition, the storage system 106 stores a first portion within the volatile memory of a first SSD in the SSD set. Additionally, the first portion may include mappings that correspond to the physical address (e.g., non-volatile memory) of other SSDs in the SSD set. Further, in some implementations, the first portion may include some mappings to data stored on the first SSD. Additionally, the storage system 106 stores a second portion of the mapping table within the volatile memory of a second SSD in the SSD set. For example, the second portion may include mappings that correspond to physical addresses on the first SSD. Additionally, the second portion may include mappings to physical addresses on the other SSDs in the SSD set. In this manner, if the one of the SSD fails, the parity and mappings on the other SSDs in the SSD set can be used to restore the second SSD.

As shown, the overview 200 includes a third element 230 of updating the set by writing new data to the set without reading previously written data pieces or their corresponding parity pieces. For example, in various implementations, the storage system 106 receives a piece of new data to store in the SSD set. In response, the storage system 106 writes the new data to an available block of non-volatile memory. In many instances, the storage system 106 writes the piece of new data with other pieces of new data. Further, the storage system generates and writes a parity for the new pieces of data.

Additionally, in various instances, the storage system 106 marks the old data for deletion, which is cleaned out in a future garbage collection process. Further, when the new piece of data is replacing an existing piece of data, the storage system 106 updates the respective mapping table portion to map to the location (e.g., memory block) of the new piece of data. Additional detail regarding storing mapping tables across SSD in an SSD set as well as efficiently writing new pieces of data is provided below in connection with FIGS. 3-6B.

Figure 3:
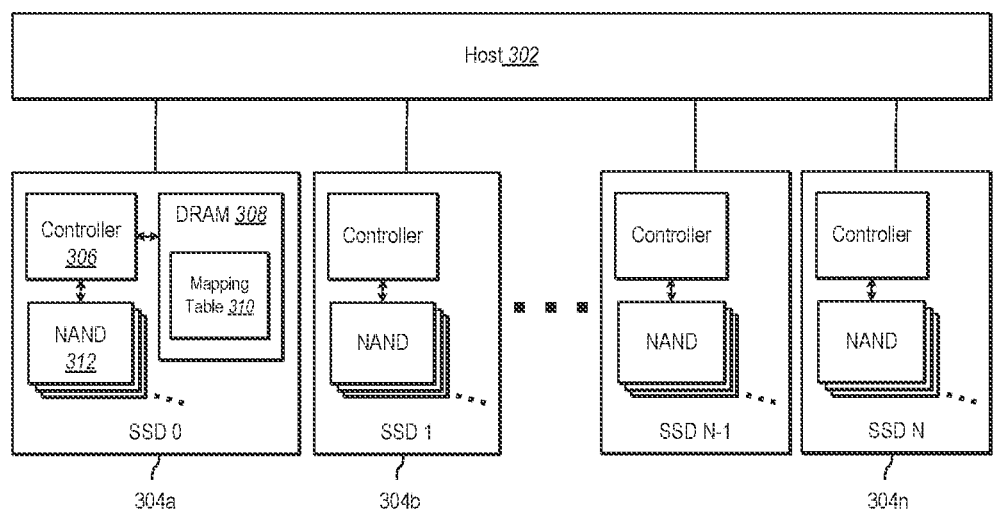
FIG. 3 illustrates a block diagram of an asymmetric implementation of the distributed parity-based RAID that stores a mapping table on an SSD in accordance with one or more implementations.

FIG. 3 illustrates a block diagram of an asymmetric implementation of the distributed RAID that stores a mapping table on an SSD in accordance with one or more implementations. As shown, FIG. 3 includes a host 302 and an SSD set (e.g., SSD 0 304a, SSD 1 304b, SSD N 304n). In various implementations, the components shown in FIG. 3 are part of a computing device, such as the computing device 102.

As illustrated, the SSDs in the SSD set include a controller 306, and NAND 312, which respectively represent examples of the controller 112 and the non-volatile memory 116 described above in connection with FIG. 1A. Additionally, SSD 0 304a includes DRAM 308, which represents an example of the volatile memory 114 described above. While not shown, other SSDs in the SSD set may or may not include DRAM. Further, the host 302 can represent the operating system 104 or a hardware controller, as described above.

As noted, FIG. 3 shows an asymmetric distributed RAID 300 (i.e., asymmetric distributed parity-based RAID), such as a RAID 4 or RAID5 scheme, across N+1 SSDs (i.e., the SSD set), where the SSDs are numbered 0 through N. In the design shown in FIG. 3, it is assumed that SSD 0 304a has enough DRAM 308 capacity to hold a mapping table 310 that maps addresses for all of the for N SSDs. For simplicity, SSD N 304n holds parity, but it could be any of the SSDs (e.g., SSD 0 304a could be the parity). In one or more implementations, parity is distributed across the SSD set.

In various implementations, the controller 306 in each SSD can represent an SSD controller application-specific integrated circuit (ASIC). As noted above, a controller can enable the storage system 106 to perform various actions with respect to storing and accessing data on an SSD. Specific to FIG. 3, the controller 306 on SSD 0 304a includes a mapping table 310. In some implementations, SSD 0 304a is the only SSD in the SSD set that exposes namespaces to the host 302. Accordingly, in FIG. 3, SSD 0 304a represents a primary SSD while SSD 1 304b through SSD N 304n represents a secondary SSD. Additionally, as used herein, a namespace in the context of NVMe technology refers to a collection of logical block addresses (LBA) accessible to host software. For example, the controller 306 utilizes a namespace ID (NSID) to provide the host 302 access to a target namespace.

In one or more implementations, the mapping table 310 (e.g., a flash translation layer (FTL) mapping table) is stored in the DRAM 308 of the primary SSD (i.e., SSD 0 304a). In some instances, the mapping table 310 maps at a granularity size of 4 KB and a RAID stripe, having N×4 KB blocks of data with one 4 KB block of parity.

Further, in various implementations, the primary SSD process, at least initially, communicates read and write commands from the host 302. In the case of block writes, the primary SSD can combine N writes of 4 KB each into a RAID stripe and write individual blocks to the NAND of corresponding secondary SSDs (e.g., at arbitrary LBAs). In addition, the primary SSD can compute parity and store it to the parity SSD (e.g., SSD N 304n).

With respect to I/O bus transfers, the storage system 106 can utilize various options that include the primary SSD initially receiving commands. As one example, if a command is a 4 KB block write command, the storage system 106 causes the primary SSD to determine a RAID stripe placement within a secondary SSD and forward the command to the appropriate secondary SSD. That SSD can communicate with the host 302 to obtain the data (e.g., via DMAs (direct memory access)) as well as write the data. In this example, the primary SSD may also DMA the data for computing the parity.

The above example assumes that the DMA data buffer is unchanged while the DMA is taking place. However, if the data buffer is subject to change, the storage system 106 can cause the primary SSD to DMA the data from the host, compute the parity, as well as transfer the data to the appropriate secondary SSD to write it to its NAND storage. In this latter case, the storage system 106 can utilize peer-to-peer writes over the PCIe interface and/or an NVMe I/O write. In alternative implementations, the storage system 106 may rely on using Controller Memory Buffers (CMBs) in the secondary SSD.

In some instances, a single read or write operation pertains to multiple 4 KB blocks. In the case of writes to multiple 4 KB blocks, each 4 KB memory block write can be treated as a separate 4 KB write and processed as described above. In the case of reads to multiple 4 KB blocks, the storage system 106 can send individual 4 KB reads to secondary SSDs. For example, a secondary SSD can DMA the data to the host 302. Additionally, the secondary SSD can send a response to the primary SSD which, in turn, can send the response to the host 302. In cases of reads being greater than 4 KB, the storage system 106 can cause the primary SSD to break them up into multiple 4 KB reads. Further, in the case of writes that are not aligned to 4 KB boundaries, the storage system 106 can cause the primary SSD to perform a read-modify-write operation.

In various implementations, the storage system 106 causes the primary SSD to manage the space in the secondary SSDs. As a first example, if the NAND in the secondary SSDs is identical to the NAND in the primary SSD, the storage system 106 can manage the NAND at the block level. For instance, the storage system 106 causes the primary SSD to allocate a stripe of erased blocks (e.g., one per SSD, including the primary itself) and program data in it. Here, the whole stripe can be closed at once. Then, at some future time, the storage system 106 performs garbage collection (GC) for the whole stripe to make it available for re-use. Additionally, the storage system 106 can perform bad block management at each individual SSD while having the primary SSD leave to handle other operations.

In a second example, if the secondary SSDs have (or potentially may have) different NAND types than the primary SSD, the storage system 106 can employ a higher level of abstraction. To illustrate, instead of managing erase blocks, the storage system 106 causes the secondary SSDs to provide the primary SSD with a linear LBA range. In various implementations, this range is equal across all SSDs, including the primary itself. In case of capacity variation between SSDs, in some instances, the storage system 106 utilizes the capacity of the smallest SSD. In other instances, the storage system 106 utilizes the capacity of the primary SSD or another one of the secondary SSDs.

In additional implementations, the storage system 106 can cause the primary SSD to use each of the LBA ranges, including its own, sequentially. For instance, after the first pass, if a sequential write encounters valid memory blocks, the storage system 106 can cause the primary SSD to skip over them and cause garbage collection (GC) in the SSD to occur.

In various implementations, the storage system 106 can utilize circular buffers to manage writing data to SSDs of the SSD set. For instance, the storage system 106 can use circular buffers to address and/or solve the problem of unequal SSD sizes in an SSD set. For example, by using a circular buffer, the storage system 106 can cause each SSD to use its own boundary for garbage collection, which resolves issues of SSDs having unequal erase block sizes. In that case, the storage system 106 can cause each SSD to perform its own garbage collection, to fully resolve the problem of unequal erase block sizes in an SSD set.

In various implementations, the storage system 106 utilizes a circular buffer that is equal across the SSDs in the SSD set. Stated another way, in these implementations, the whole circular buffer is the same size, even if erase block sizes are different. Here, while the circular buffer is the same size globally, the storage system 106 can cause each of the SSDs to utilize its own boundaries, including garbage collection boundaries. For example, given a whole circular buffer of 1 GB, if a first SSD has an erase boundary of 16 MB, and a second SSD has an erase boundary of 32 MB. The smaller SSD will need to be performed 64 times while the larger SSD only performs 32 times. In this manner, the storage system 106 need not worry about the individual garbage collection boundaries and cause each SSD to perform garbage collection sequentially according to its own size.

To illustrate, if all of the SSDs in an SSD set are the exact same model, then it is relatively easy for the storage system 106 to perform writes and garbage collection. In particular, the storage system 106 can split the controller across each of the SSDs and perform operations regardless of if the controller is split. But if the SSDs are different in any way (e.g., different models, different capacity, different block sizes, different garbage collection boundaries, different manufacturers, or different device generations), problems can arise, and in particular with respect to garbage collection. For example, if garbage collection occurs on different boundaries on each SSDs, the storage system 106 may over-delete portions of an SSD.

In various implementations, garbage collection does create overhead on the above implementations. However, existing computer systems experience similar garbage collection overhead. Further, in many implementations, the storage system 106 performs less garbage collection than existing computer systems because the existing storage system 106 is performing double writes, which requires twice as much garbage collection.

As additional detail regarding circular buffers, in some instances, the storage system 106 can cause the primary SSD to facilitate the LBA range from each SSD in a way that makes it simple for the secondary SSDs to manage their NAND space with minimal memory requirements. In various implementations, the storage system 106 can cause the primary SSD to manage garbage collection such that the secondary SSDs do not have to track which blocks are valid. To enable this, the storage system 106 can utilize overprovisioning in the LBA range for garbage collection. However, in some instances, individual SSDs will hold back a small portion of the blocks, mostly for bad block management. In some implementations, if multiple namespaces are supported, each namespace can have its own LBA range and the size of the LBA range will determine the amount of overprovisioning (OP) for that namespace. Additionally, different namespaces can have different amounts of overprovisioning.

In some implementations, when the namespace is first allocated, the associated LBA range of one or more SSDs in an SSD set is marked as ready to delete (e.g., the blocks are in a TRIM state). In these implementations, the storage system 106 can cause the primary SSD to treat this LBA range as a circular buffer, which writes blocks from beginning to end. For example, as the primary SSD receives new memory block writes, the storage system 106 causes the primary SSD to eventually overwrite some previously written memory blocks. In various implementations, the storage system 106 does not need to send a TRIM command to the secondary SSD that stores these overwritten blocks as the primary SSD will remember that these blocks have invalid addresses.

In additional implementations, on subsequent passes of writing into the circular buffer, the primary SSD will likely encounter both valid and invalid blocks. Here, the storage system 106 can cause the primary SSD to direct writes in sequential order to the invalid blocks while skipping over the valid ones. In some implementations, the storage system 106 can cause the secondary SSD to maintain at least one free superblock to process these writes.

In the case of skipped blocks, in various implementations, the storage system 106 can cause the existing data to be copied into the new superblock. Then, by the time the new superblock is full, the storage system 106 can cause the old superblock to be erased as it will not contain any valid data. In this manner, the storage system 106 facilitates the secondary SSDs to maintain mappings at a superblock granularity rather than 4 KB block granularity, which greatly minimizes the memory requirements.

Figure 4:
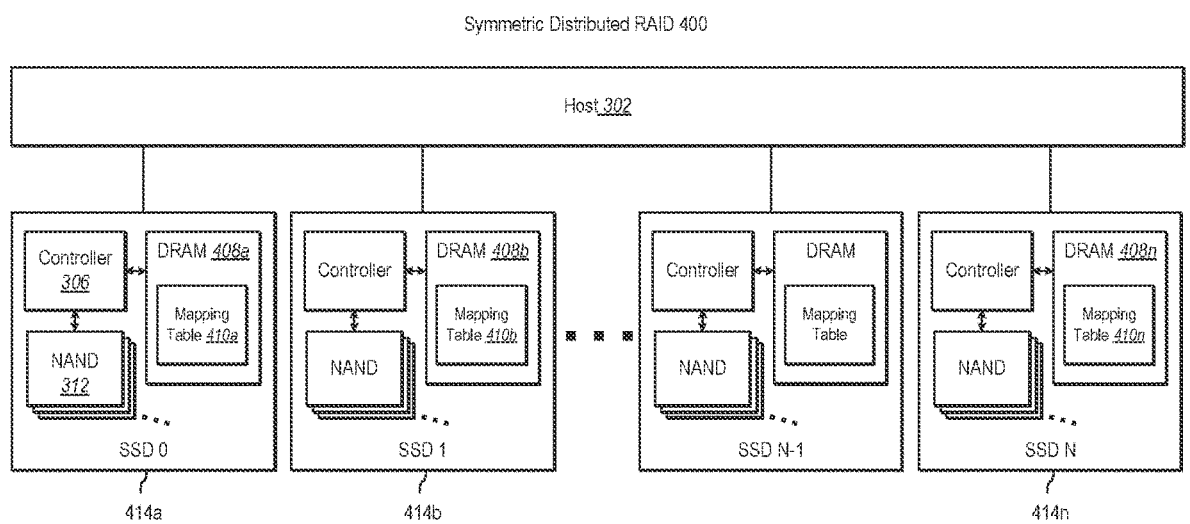
FIG. 4 illustrates a block diagram of a symmetric implementation of the distributed parity-based RAID that stores a mapping table across multiple SSDs in accordance with one or more implementations.

While FIG. 3 shows an asymmetric implementation of the distributed parity-based RAID, FIG. 4 advances the concept to a symmetric implementation of the distributed parity-based RAID. In particular, FIG. 4 illustrates a block diagram of a symmetric implementation of the distributed RAID 400 that stores a mapping table across multiple SSDs in accordance with one or more implementations. As shown, FIG. 4 includes the host 302 and an SSD set (e.g., SSD 0 414*a*, SSD 1 414*b*, SSD N 414*n*). In various implementations, the components shown in FIG. 4 are part of a computing device, such as computing device 102.

As illustrated, the SSDs in the SSD set each includes the controller 306, and the NAND 312 introduced above in connection with FIG. 3. Additionally, unlike the asymmetric distributed RAID 300, the SSDs in the SSD set of the symmetric distributed RAID 400 each includes DRAM (e.g., volatile memory). Indeed, in many implementations, the DRAM on an SSD is often too small to accommodate a full mapping table for multiple SSDs.

Further, as shown, each DRAM includes a mapping table (e.g., a portion of a mapping table). In particular, SSD 0 414*a* includes a first DRAM 408*a* with a first mapping table 410*a*, and SSD 1 414*b* includes a second DRAM 408*b* with a second mapping table 410*b*. This can continue until SSD N−1 includes an n-th DRAM with an n-th mapping table (i.e., each of these SSDs has 1/n of the full mapping table).

In some implementations, SSD N 414*n* is a parity drive and does not include a mapping table. According to a few implementations, SSD N 414*n* is a parity drive that also includes a 1/n allotment of the mapping table 410*n* in the DRAM. In various implementations, parity is rotated across the drives and SSD N 414*n* includes a mapping table inside of the DRAM 408*n*.

As shown in the symmetric distributed RAID 400, the storage system 106 can utilize mapping tables stored locally on SSDs out of an external controller. For example, in various implementations, the storage system 106 generates a full mapping table that maps all of the NAND locations of saved data across the SSD set, then divides it into N portions, which are stored across N SSDs drives (e.g., all but the parity SSD).

In some implementations, the storage manager provides a mapping table to an SSD drive that does not include mappings to any NAND location on that SSD (i.e., all mappings are to other SSDs). For instance, the first mapping table 410*a* does not include any mappings to data stored in the NAND on SSD 0 414*a*. In one or more implementations, the storage manager can provide a mapping table to an SSD drive that includes some mappings to its own NAND. However, in these implementations, the mapping table also includes mappings to data stored in the NAND of other SSDs in the SSD set. Indeed, instead of a DRAM only including a mapping for its own NAND (e.g., tied to itself), an SSD includes a mapping table for other SSDs in a group for a subset of a range (e.g., the SSD set of the set minus one SSD depending on the RAID scheme).

In various instances, when a full mapping table is divided into portions, the mapping table portions are mutually exclusive, meaning that the logical addresses and the corresponding physical NAND addresses are not duplicated in different mapping table portions. In other instances, the storage system 106 may allow for and/or provide some overlap between portions. For example, depending on available volatile memory on an SSD, the storage system 106 may provide the SSD 0 and SSD N−1 with the same logical mapping to a physical location on SSD 1.

In one or more implementations, a mapping table portion on one SSD maps to another SSD in the SSD set. For example, the second mapping table 410*b* on SSD 1 414*b* includes an exclusive mapping for SSD 0 414*a*. In other implementations, the second mapping table 410*b* on SSD 1 414*b* includes mappings to SSD 0, SSD 1, SSD N−1, and SSD N. As noted, in these implementations, the storage system 106 may exclude a mapping table on an SSD from mapping to its own NAND, or the storage system 106 may allow the mapping table to map to its own NAND.

In many implementations, the SSD set in the symmetric distributed RAID 400 includes identical SSDs that each includes enough DRAM capacity to match mapping to the NAND plus enough capacity to temporarily store data pieces such that the storage system 106 can perform other functions, as described above. In some implementations, each SSD in the SSD set is capable of acting as a primary SSD for some or all of the SSD set.

To illustrate, in various implementations, each SSD will act as a primary SSD for a 1/N fraction of the capacity from each SSD (e.g., distributed across the SSD set). In some implementations, each SSD can expose an (N−1)/N fraction of its NAND capacity as a secondary SSD for use by the other SSDs in the SSD set. In some implementations, an SSD acting as a primary SSD can control more than a 1/N fraction of SSDs in the SSD set (but less than N SSDs in the SSD set).

In various implementations, an SSD can appear as a separate SSD to the host 302 and the namespaces created within that SSD fits within the mapping table and DRAM of that SSD. In other words, each SSD (e.g., the controller 306 on each SSD) does not generate and populate a mapping table that is larger than its DRAM capacity. Rather, each SSD includes a smaller portion of a full mapping table that is spread across all the SSDs. This also provides the advantage of avoiding performance hot spots on any one SSD as well as enables the storage system 106 to perform capacity and performance overcommitting more efficiently.

As provided above, the architecture of the symmetric distributed RAID 400 can tolerate the failure of the NAND of at least one SSD (e.g., a back-end failure). However, if the controller on an SSD that is acting as a primary SSD fails (e.g., a front-end failure), the mapping table exported by that SSD can become unavailable. But the SSDs and the mapping tables on the remainder of the SSDs in the SSD set will continue to function.

The above scenario assumes that when an SSD fails, the whole SSD fails. However, if there is isolation between the NAND (e.g., the back-end) and the controller and/or DRAM (e.g., the front-end) of a primary SSD, then it is possible that a failure in the back-end will not take out the front-end (and vice versa). If so, the mapping table on the SSD will continue to work and the NAND data can be restored via parity protection.

In some implementations, the storage system 106 causes a primary SSD front-end of each SSD to periodically save its FTL state (e.g., its mapping table) to a different secondary SSD (e.g., NAND on another SSD). In this manner, if the front-end of an SSD fails, its mapping table can be retrieved with little to no loss. In some implementations, the storage system 106 may have to rebuild the mapping table to apply any changes made since the last save checkpoint. In various implementations, the storage system 106 may also have to repeat any outstanding commands that were lost in the failed front-end (e.g., via the NVMe driver).

Additionally, in many implementations, only N out of N+1 SSDs act as primary SSDs as the capacity of one SSD is utilized for parity. In these implementations, if the front-end of an SSD fails, the N+1-th SSD takes over the failed function in a seamless or near seamless manner (e.g., without needing to physically change out drives).

In various implementations, in the case of power failure where volatile memory is lost (e.g., DRAM), the storage system 106 can copy a mapping table of an SSD to NAND on the same or different SSD utilizing residual power. For example, an SSD includes one or more backup capacitors that provide enough power to copy its mapping table (or mapping table portion) to non-volatile memory.

In some implementations, if a mapping table rebuild is needed, the storage system 106 can perform a reverse mapping of the physical data to determine corresponding logical addresses. In these implementations, when writing data to physical locations, the storage system 106 also causes the logical address of the sector to be written. Additionally, in these implementations, the storage system 106 can scan an SSD and rebuild the mapping table and/or split up the mapping table into mapping table portions to be stored across the SSD set, as described above.

Figure 5:
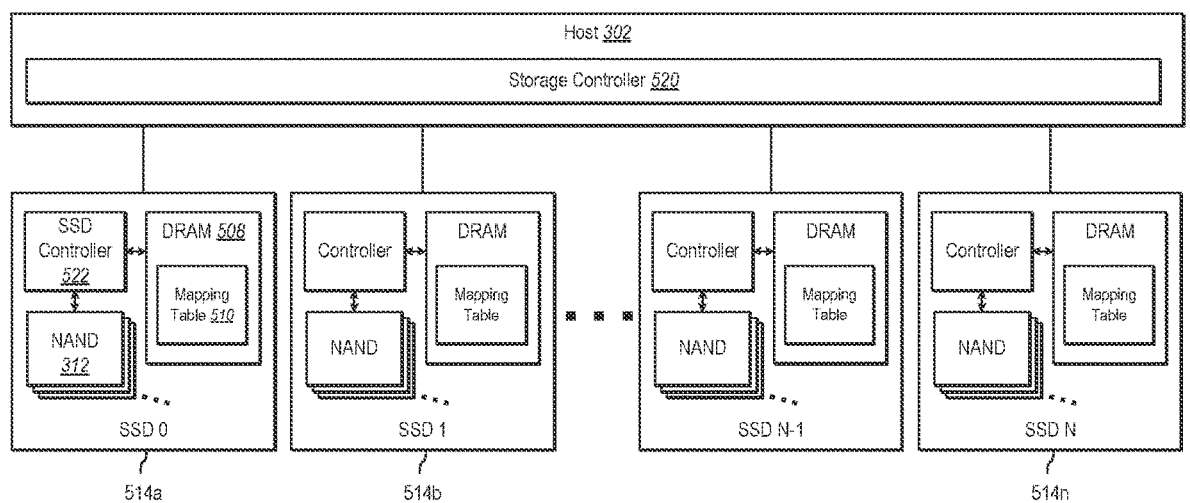
FIG. 5 illustrates a block diagram of a distributed parity-based RAID with an external storage controller in accordance with one or more implementations.

FIG. 5 illustrates a block diagram of a symmetric distributed RAID with an external storage controller 520 in accordance with one or more implementations. As shown, FIG. 5 includes the host 302 and an SSD set (e.g., SSD 0 514a, SSD 1 514b, SSD N 514n). In addition, the SSDs can include an SSD controller 522, NAND 312, and DRAM 508 having a mapping table 510. The NAND 312, the DRAM 508, and the mapping table 510 can be similar to the NAND 312, the DRAM 408a, and the first mapping table 410a that are described above in connection with FIG. 4.

As shown, the host 302 includes a storage controller 520. In various implementations, the storage system 106 causes the storage controller 520 to perform one or more functions of a primary SSD described above. However, while the storage controller 520 is shown external to the SSD set, the portions of the mapping tables are stored across the DRAMs of the SSDs, as described above. Indeed, the storage controller 520 does not require an external DRAM that includes a full copy of the mapping table.

As mentioned, the SSDs can include an SSD controller 522. In some implementations, the SSD controller 522 is physically similar to the controller 306 described above but performs fewer functions. For example, the storage system 106 performs SSD control functions via the SSD controller 522 while leaving other coordinated memory functions of the storage controller 520.

To elaborate, in some instances, RAID functions are performed by a centralized RAID controller that controls multiple storage devices, (e.g., SSDs or HDDs). The implementations described in asymmetric distributed RAID 300 and symmetric distributed RAID 400 assume the absence of such a controller. In this manner, the storage system 106 avoids the cost of such a controller, which, additionally, is not commonly available for NVMe SSDs.

However, if such a controller happens to be available, the storage system 106 can utilize it, as shown with the external storage controller 520 in FIG. 5. For example, as noted above, one problem with a centralized RAID controller is that small memory block writes incur the penalty of two reads and two writes. The above implementations show how the storage system 106 avoids this problem by performing RAID functions using mapping tables stored within the volatile memory of one or more SSDs. Indeed, as shown in FIG. 5, the storage system 106 implements parity generation and data re-building (when required) via the storage controller 520 (a centralized RAID controller), but the storage system 106 retains the mapping table on one or more SSDs in the SSD set.

Accordingly, in various implementations, the storage system 106 maintains the mapping table within the DRAM in the SSDs, as described above. In these implementations, the storage system 106 causes SSDs to still re-direct read commands as described above. However, the storage system 106 can cause memory block writes to be placed by the centralized RAID controller (e.g., the storage controller 520). Also, the storage system 106 can cause the storage controller 520 to read the mapping table portions from an SSD when RAID re-builds are required.

Figure 6A:
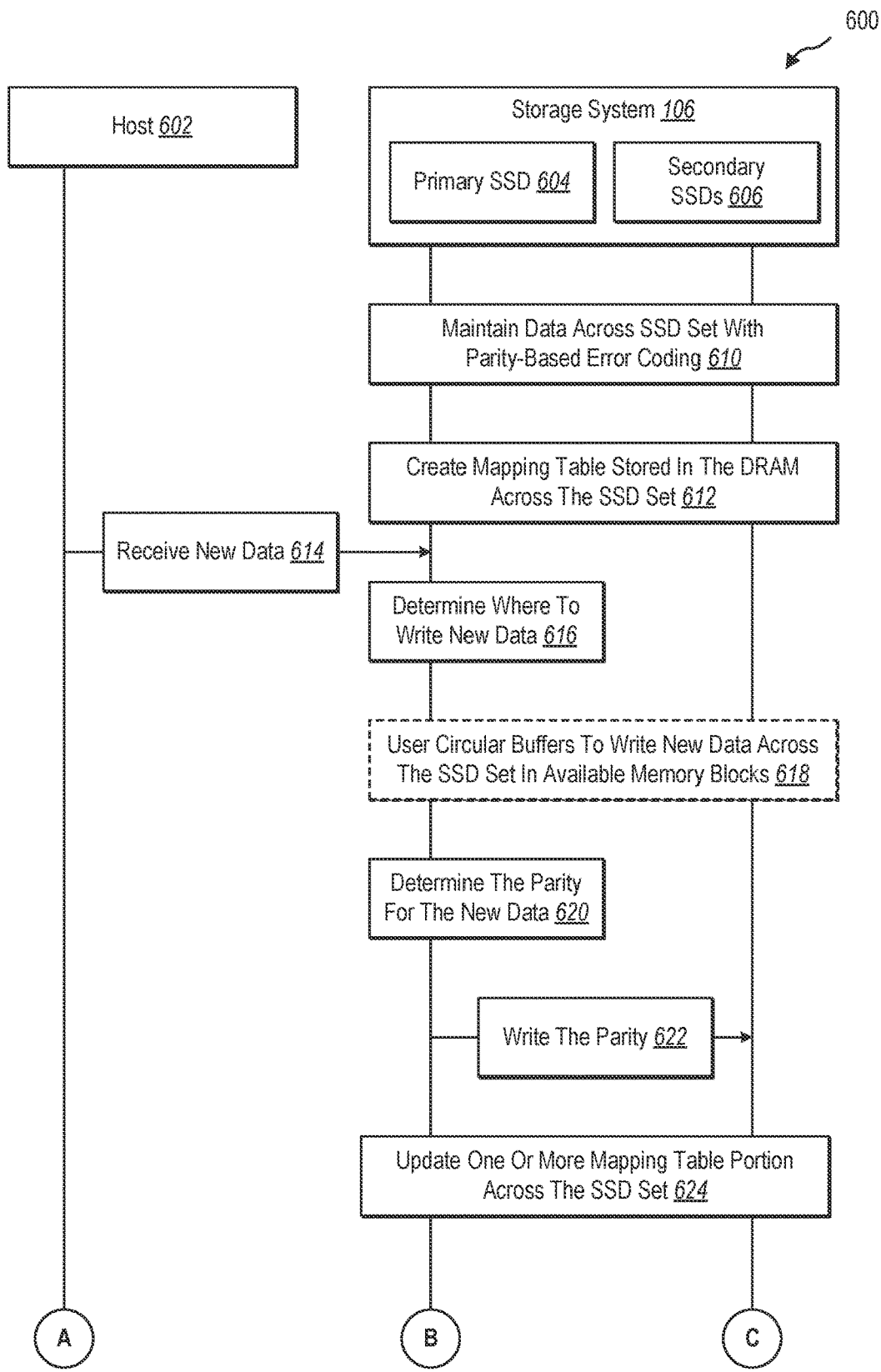
FIGS. 6A-6B illustrate a sequence diagram of efficiently maintaining, writing, and accessing data on a distributed parity-based RAID in accordance with one or more implementations.
Figure 6B:
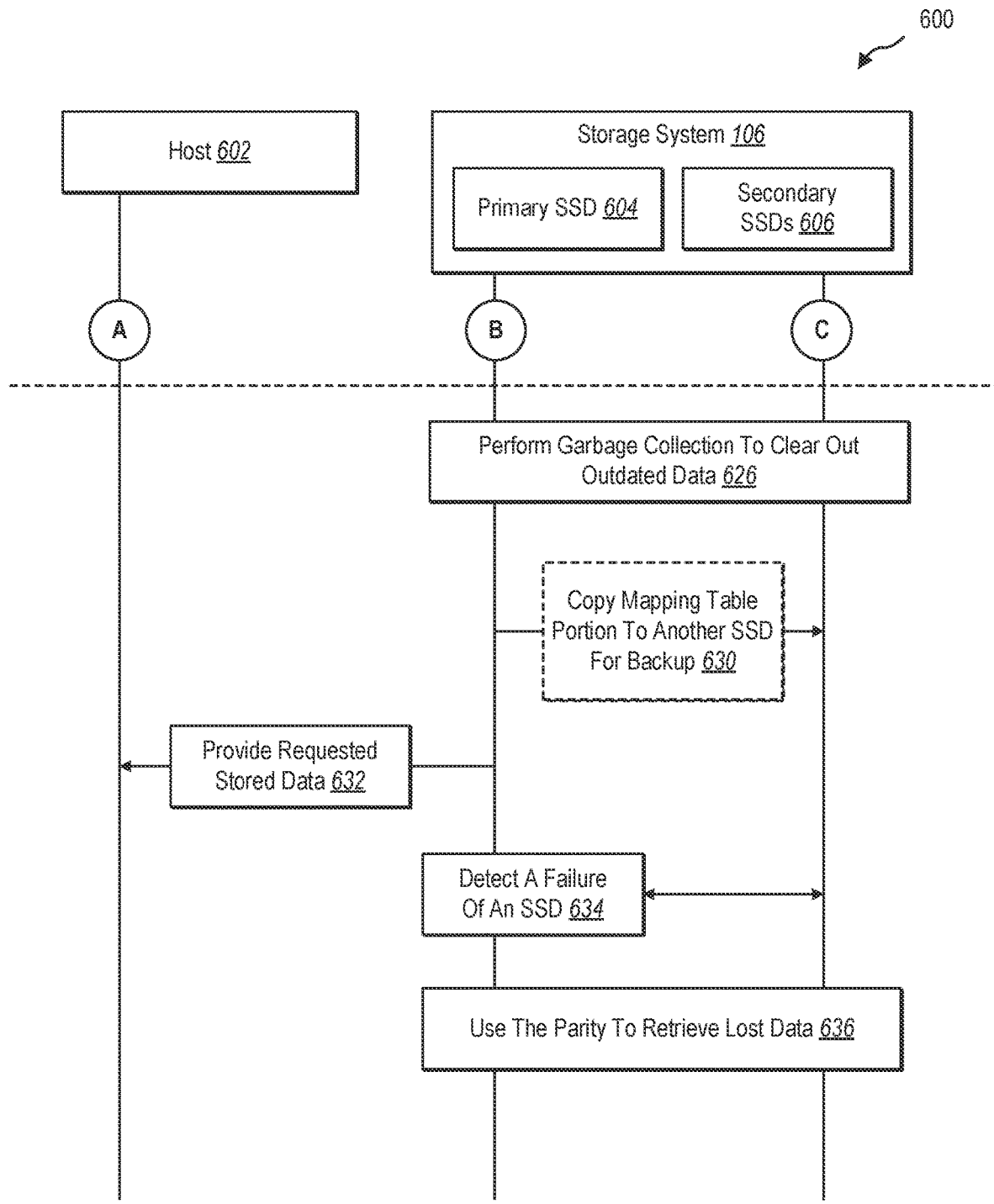

Turning now to the next figures, FIGS. 6A-6B illustrate a sequence diagram of efficiently maintaining, writing, and accessing data on a distributed parity-based RAID in accordance with one or more implementations. As shown, FIGS. 6A-6B includes a host 602 (e.g., the operating system 104 and/or host 302) and the storage system 106, which includes a primary SSD 604 and secondary SSDs 606. The primary SSD 604 and the secondary SSDs 606 can represent similar components described above. As further shown, FIGS. 6A-6B includes a series of acts 600 performed by the storage system 106.

As shown, the series of acts 600 includes an act 610 of maintaining data across an SSD set that utilizes parity-based error coding. For example, as described above, the storage system 106 can store data in a RAID 5 scheme that includes N+1 SSDs for storing data across N SSD (and the capacity of an SSD for parity).

As shown, the series of acts 600 includes an act 612 of creating a mapping table stored in the DRAM across the SSD set. In various implementations, the storage system 106 generates and distributes a mapping table across multiple SSDs in the SSD set. In particular, the storage system 106 stores portions of the mapping table in volatile memory (e.g., DRAM). Indeed, as described above, the storage system 106 stores the mapping table within the SSD set rather than outside in connection with an external storage controller. Also, as described above, in some implementations, the storage system 106 utilizes one or more storage controller s within the SSD set.

As also shown, the series of acts 600 includes an act 614 of receiving new data from the host 602. For example, in various implementations, the storage system 106 receives new data to store in the SSD set or receives new data to replace an old piece of data stored in the SSD set. In various implementations, the storage system 106 accumulates multiple pieces of new data before writing it to available memory blocks (e.g., a NAND space) in the SSD set. For example, the storage system 106 stores received pieces of data in volatile memory (e.g., DRAM) on a primary SSD 604 until it has a sufficient number of data pieces.

Upon receiving the new data, the storage system 106 can determine where to write the data, as shown in the act 616. For example, the storage system 106 can determine, at a primary SSD 604, to write the new data to a memory block within the NAND on a secondary SSDs 606.

As shown, the series of acts 600 includes an optional act 618 of utilizing circular buffers to write new data across the SD set in available memory blocks. As noted above, in various implementations, the storage system 106 utilizes circular buffers to address the problem of unequal SSD sizes in an SSD set, and, in particular, issues that arise when garbage collection boundaries are uneven.

As shown, the series of acts 600 includes an act 620 of determining the parity for the new data. For example, the storage system 106 causes the primary SSD 604 to calculate parity for the new data. In some instances, the storage system 106 can also determine a memory location where to write the parity. In cases where multiple pieces of received data are being written together, the storage system 106 can reduce processing steps by calculating one parity for the different small memory block writes. In this manner, the storage system can perform one write for the new piece of data and one parity write that is shared by multiple pieces of received data (e.g., 5 pieces of data+1 parity=6 writes rather than 10 writes for 5 pieces of data and 5 parity changes). Further, the storage system 106 can write the parity, as shown in the act 622 of the series of acts 600.

As shown, the series of acts 600 includes an act 624 of updating one or more mapping table portions across the SSD set. For example, the storage system 106 causes a primary SSD 604 to update the mapping for the new data piece in the respective mapping table portion. As provided above, the storage system 106 can continuously update mapping tables to maintain an accurate mapping between logical memory addresses and corresponding physical NAND memory locations within the SSD set.

As shown in FIG. 6B, the series of acts 600 includes an act 626 of performing garbage collection to clear out outdated data. For instance, in various implementations, the storage system 106 causes one or more SSDs to perform garbage collection to free up available memory sectors. As provided above, a primary SSD 604 can perform garbage collection for itself, and in some cases, for one or more of the secondary SSDs 606.

As shown, the series of acts 600 includes an optional act 630 of copying a mapping table portion to another SSD for backup. As provided above, in various implementations, the storage system 106 can cause a primary SSD 604 to record periodic backups of its memory table in non-volatile memory (e.g., NAND memory) of one of the secondary SSDs 606. In this manner, if the primary SSD 604 fails, the storage system 106 can more quickly and efficiently restore its lost mapping table with little data loss. Further, the loss of power will not cause the saved copy of the mapping table to be lost.

As shown, the series of acts 600 includes an act 632 of providing requested stored data. For example, the host 602 requests access to data that is stored in the SSD set. Accordingly, the storage system 106 causes a primary SSD 604 to lookup the data from a mapping table, and provide (e.g., either with the primary SSD 604 or the secondary SSDs 606) the requested data to the host 602.

As shown, the series of acts 600 includes an act 634 of detecting a failure of an SSD. For example, the storage system 106 determines that some or all of an SSD in the SSD set has failed. In some cases, the failure is temporary, such as loss of power. In other cases, the failure is more permanent, such as drive failure. Additionally, as shown, the series of acts 600 includes an act 636 of using the parity to retrieve lost data. For example, the storage system 106 uses parity to detect any lost data in the NAND and/or restores any saved data from DRAM, such as a backed-up mapping table. Otherwise, the storage system 106 can quickly rebuild the mapping table.

Figure 7:
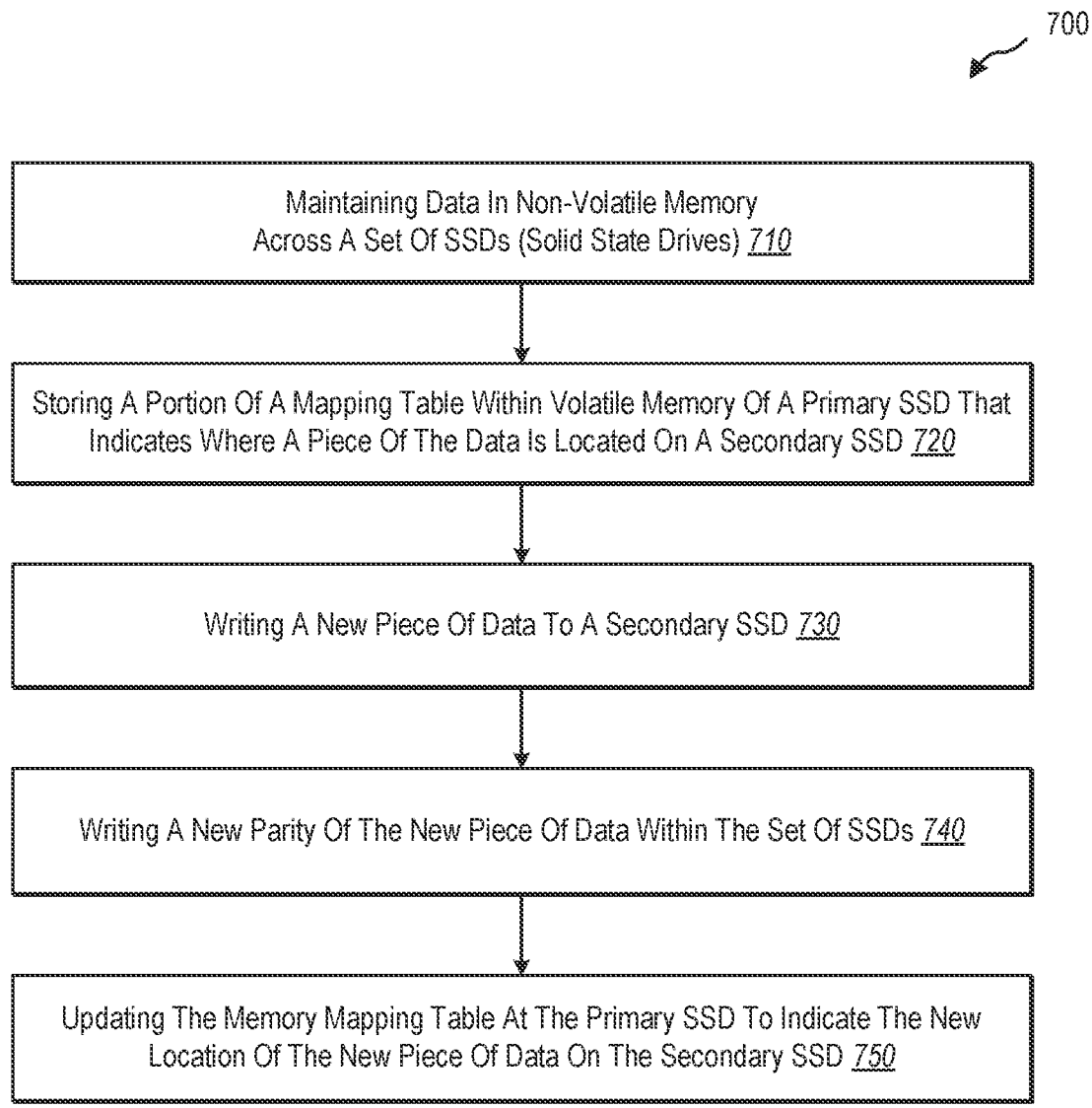
FIG. 7 illustrates an example series of acts of improving memory storage and access by utilizing distributed parity-based RAIDs that stores a mapping table across multiple SSDs in accordance with one or more implementations.

Turning now to FIG. 7, this figure illustrates example flowcharts including a series of acts 700 of improving memory storage and access by utilizing a distributed parity-based RAID that stores a mapping table across multiple SSDs in accordance with one or more implementations. While FIG. 7 illustrates acts according to one or more implementations, alternative implementations may omit, add to, reorder, and/or modify any of the acts shown. Further, the acts of FIG. 7 can be performed as part of a method. Alternatively, a non-transitory computer-readable medium can include instructions that, when executed by one or more processors, cause a computing device to perform the acts of FIG. 7. In still further implementations, a system can perform the acts of FIG. 7.

As shown, the series of acts 700 includes an act 710 of maintaining data in non-volatile memory across a set of SSDs (solid-state drives). For instance, the act 710 may include maintaining data in non-volatile memory across a set of SSDs including a primary SSD and one or more secondary SSDs, where the set of SSDs utilizes parity-based error coding to mitigate an SSD drive failure. In various implementations, the act 710 includes maintaining data in NAND memory across the set of SSDs that includes a first SSD and a second SSD.

In various implementations, the act 710 includes utilizing a storage controller to control storing, reading, and writing pieces of data across the set of SSDs. In one or more implementations, a storage controller is located external to the set of SSDs. In various implementations, a storage controller is distributed across the set of SSDs.

In several implementations, the act 710 includes receiving the new piece of data. In some instances, the new piece of data updates a stored piece of data. In example implementations, the parity-based error coding utilized to mitigate an SSD drive failure distributes the data across SSDs within the set of SSDs and/or includes rotating parities across SSDs within the set of SSDs.

As further shown, the series of acts 700 includes an act 720 of storing a portion of a mapping table within a volatile memory of a primary SSD that indicates where a piece of the data is located on a secondary SSD. For example, the act 720 may involve storing at least one portion of a mapping table within a volatile memory of the primary SSD that indicates a first non-volatile memory location within the one or more secondary SSDs where a piece of the data is located.

In various implementations, the act 720 includes storing, within a first DRAM on the first SSD, a first portion of a mapping table that indicates where a first piece of the data is located within the NAND memory of the second SSD; and/or storing, within a second DRAM on the second SSD, a second portion of the mapping table that indicates where a second piece of the data is located within the NAND memory of the first SSD. In one or more implementations, the act 720 includes storing a first portion of the mapping table within volatile memory (e.g., DRAM) of the primary SSD and/or storing at least a second portion of the mapping table within a volatile memory of the one or more secondary SSDs.

As further shown, the series of acts 700 includes an act 730 of writing a new piece of data to a secondary SSD. For example, the act 730 may include writing a new piece of data at a second non-volatile memory location within the one or more secondary SSDs. In one or more implementations, the act 730 includes utilizing a circular buffer to write the new piece of data. In some implementations, the act 730 includes writing the new piece of data to less than a full memory sector of data.

As further shown, the series of acts 700 includes an act 740 of writing a new parity for the new piece of data within the set of SSDs. For example, the act 740 may involve writing a new parity for the new piece of data at a third non-volatile memory location within the set of SSDs. In some implementations, the act 740 includes writing the new piece of data and the new parity to the set of SSDs without reading the piece of data (e.g., or reading surrounding old data) or a parity corresponding to the piece of data.

In some implementations, the act 740 includes that a second DRAM on a second SSD includes a second portion of the mapping table (which indicates that a second piece of the data is located within a second non-volatile memory location on the first SSD), that a first portion of the mapping table (e.g., storage mapping table) in the first DRAM of the first SSD also indicates that a second piece of the data is located within a second non-volatile memory location on the first SSD, and/or that the first portion of the mapping table in the first DRAM of the first SSD also indicates that a third piece of the data is located within a third non-volatile memory location in the set of SSDs other than on the first SSD or the second SSD. In some implementations, a parity for the first piece of data is located within a second non-volatile memory location (e.g., memory block) in the set of SSDs other than on the second SSD.

As further shown, the series of acts 700 includes an act 750 of updating the mapping table at the primary SSD to indicate the new location of the new piece of data on the secondary SSD. For example, the act 750 may include updating the mapping table within volatile memory on the primary SSD to indicate a new non-volatile memory location of the new piece of data.

In various implementations, the series of acts 700 includes an act of storing a copy of the at least one portion of the mapping table within a fourth non-volatile memory location within the one or more secondary SSDs. In some implementations, the series of acts 700 includes an act of utilizing a garbage collection process to remove the piece of data from the first non-volatile memory location within the one or more secondary SSDs after writing the new piece of data at the second non-volatile memory location within the one or more secondary SSDs. In certain implementations, the series of acts 700 includes writing additional pieces of new data at non-volatile memory locations across multiple SSDs of the one or more secondary SSDs, where the multiple SSDs include different specifications (e.g., a different sizes, capacities, block sizes, garbage collection blocks, manufacturers, software versions, etc.), and where writing the additional pieces of new data comprises utilizing a circular buffer to write the additional pieces of new data to the multiple SSDs having different specifications. In some implementations, the non-volatile memory in each SSD of the set of SSDs is managed as one or more circular buffers.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the storage system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud-computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

FIG. 8 illustrates certain components that may be included within a computer system 800. The computer system 800 may be used to implement the various computing devices, components, and systems described herein.

In various implementations, the computer system 800 may represent one or more of the client devices, server devices, and/or other computing devices described above. For example, the computer system 800 may refer to various types of network devices capable of accessing data on a network, a cloud-computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud-computing system), or another non-portable device.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A storage system comprising:
a set of SSDs (solid-state drives) that utilize erasure coding to mitigate an SSD drive failure, wherein each SSD in the set of SSDs comprises dynamic random access memory (DRAM) and non-volatile memory;
a storage controller; and
a mapping table that maps locations of data stored within the non-volatile memory across the set of SSDs, wherein;
a first DRAM on a first SSD of the set of SSDs comprises a first portion of the mapping table indicating that a first piece of the data is located within a first non-volatile memory location on a second SSD of the set of SSDs; and
each portion of the mapping table located in the first DRAM of the first SSD does not include mappings to any data located within non-volatile memory locations on the first SSD.

2. The storage system of claim 1, wherein a second DRAM on the second SSD comprises a second portion of the mapping table indicating that a second piece of the data is located within a second non-volatile memory location on the first SSD.

3. The storage system of claim 1, wherein the first portion of the mapping table in the first DRAM of the first SSD also indicates that a second piece of the data is located within a second non-volatile memory location on the first SSD.

4. The storage system of claim 3, wherein each portion of the mapping table within the set of SSDs does not include data indications for data located within a same SSD as the portion of the mapping table.

5. The storage system of claim 1, wherein the non-volatile memory in each SSD in the set of SSDs is managed as one or more circular buffers.

6. The storage system of claim 1, wherein a parity for the first piece of data is located within a second non-volatile memory location in the set of SSDs other than on the second SSD.

7. The storage system of claim 1, wherein:
a third SSD in the set of SSDs includes parity data; and
the third SSD does not include a mapping table portion.

8. The storage system of claim 1, wherein:
a third SSD in the set of SSDs includes parity data; and
the third SSD includes a mapping table portion.

9. A computer-implemented method, comprising:
maintaining data in non-volatile memory across a set of SSDs (solid-state drives) comprising a primary SSD and one or more secondary SSDs, wherein the set of SSDs utilizes erasure coding to mitigate an SSD drive failure;
storing a portion of a mapping table within volatile memory of the primary SSD that indicates a first non-volatile memory location within the one or more secondary SSDs where a piece of the data is located at, wherein the volatile memory of the primary SSD includes a single mapping table portion, and wherein the portion of the mapping table does not include mappings to any non-volatile memory locations within the primary SSD;
writing a new piece of data at a second non-volatile memory location within the one or more secondary SSDs;
writing a new parity for the new piece of data at a third non-volatile memory location within the set of SSDs; and
updating the mapping table within the volatile memory on the primary SSD to indicate a new non-volatile memory location of the new piece of data.

10. The computer-implemented method of claim 9, wherein writing the new piece of data and the new parity to the set of SSDs does not comprise reading the piece of data or a parity corresponding to the piece of data.

11. The computer-implemented method of claim 9, wherein writing the new piece of data at the second non-volatile memory location comprises utilizing a circular buffer to write the new piece of data.

12. The computer-implemented method of claim 9, further comprising dividing the mapping table into mapping table portions stored within volatile memory across the set of SSDs, wherein the mapping table portions do not include duplicated indications to pieces of data at non-volatile memory locations within the set of SSDs.

13. The computer-implemented method of claim 9, further comprising dividing the mapping table into mapping table portions stored within volatile memory across the set of SSDs, wherein one of the mapping table portions includes a duplicate indication to a piece of data at a non-volatile memory location within the set of SSDs.

14. The computer-implemented method of claim 9, further comprising utilizing a garbage collection process to remove the piece of data from the first non-volatile memory location within the one or more secondary SSDs after writing the new piece of data at the second non-volatile memory location within the one or more secondary SSDs.

15. The computer-implemented method of claim 9, wherein writing the new piece of data at the second non-volatile memory location comprises writing the new piece of data to less than a full memory sector of data.

16. The computer-implemented method of claim 9, wherein storing the portion of the mapping table within volatile memory of the primary SSD comprises storing a first portion of the mapping table within volatile memory of the primary SSD and storing at least a second portion of the mapping table within volatile memory of the one or more secondary SSDs.

17. The computer-implemented method of claim 9, further comprising:
   utilizing a storage controller to control reading and writing pieces of data across the set of SSDs; and
   writing additional pieces of new data at non-volatile memory locations across multiple SSDs of the one or more secondary SSDs, wherein the multiple SSDs comprise different specifications, wherein writing the additional pieces of new data comprises utilizing a circular buffer to write the additional pieces of new data to the multiple SSDs having different specifications.

18. A computer-implemented method, comprising:
   maintaining data in NAND memory across a set of SSDs (solid-state drives) comprising a first SSD and a second SSD, wherein the set of SSDs utilizes erasure coding to mitigate an SSD drive failure;
   storing, within a first DRAM (dynamic random access memory) on the first SSD, a first portion of a mapping table that indicates where a first piece of the data is located within NAND memory of the second SSD; and
   storing, within a second DRAM on the second SSD, a second portion of the mapping table that indicates where a second piece of the data is located within NAND memory of the first SSD, wherein each portion of the mapping table stored in DRAM across the set of SSDs does not include mappings to NAND located on a same SSD.

19. The computer-implemented method of claim 18, wherein the erasure coding comprises a parity-based error coding utilized to mitigate an SSD drive failure comprises distributing the data across SSDs within the set of SSDs.

20. The computer-implemented method of claim 18, wherein the erasure coding comprises a parity-based error coding utilized to mitigate an SSD drive failure comprises rotating parities across SSDs within the set of SSDs.

* * * * *